United States Patent
Houle et al.

(10) Patent No.: US 10,870,142 B2
(45) Date of Patent: Dec. 22, 2020

(54) HYDRAULIC TUBE EXPANDER AND METHOD OF USE

(71) Applicant: DIVERSITECH CORPORATION, Duluth, GA (US)

(72) Inventors: Joseph Houle, Westfield, MA (US); Roman Lomeli, Plymouth, MA (US)

(73) Assignee: Diversitech Corporation, Duluth, GA (US)

( * ) Notice: Subject to any disclaimer, the term of this patent is extended or adjusted under 35 U.S.C. 154(b) by 249 days.

(21) Appl. No.: 15/997,376

(22) Filed: Jun. 4, 2018

(65) Prior Publication Data

US 2018/0281046 A1 Oct. 4, 2018

Related U.S. Application Data

(62) Division of application No. 14/440,176, filed as application No. PCT/US2013/023152 on Jan. 25, 2013, now Pat. No. 9,987,672.

(60) Provisional application No. 61/598,669, filed on Feb. 14, 2012.

(51) Int. Cl.
*B21D 41/02* (2006.01)
*B29C 57/04* (2006.01)

(52) U.S. Cl.
CPC ........... *B21D 41/02* (2013.01); *B21D 41/021* (2013.01); *B29C 57/04* (2013.01); *B21D 41/028* (2013.01)

(58) Field of Classification Search
CPC ........ B21D 19/00; B21D 39/08; B21D 39/20; B21D 41/02; B21D 41/021; B21D 41/025; B21D 41/026; B21D 41/028; B29C 57/04

See application file for complete search history.

(56) References Cited

U.S. PATENT DOCUMENTS

| | | | |
|---|---|---|---|
| 2,865,640 A * | 12/1958 | Watson | B21D 39/203 279/2.08 |
| 3,888,102 A | 6/1975 | Nigido | |
| 4,494,398 A | 1/1985 | Svoboda | |
| 6,619,099 B2 | 9/2003 | Barjesteh | |
| 8,333,102 B2 * | 12/2012 | Van Opynen | B21D 41/02 72/453.15 |
| 9,492,857 B2 * | 11/2016 | Hasenberg | B21D 19/00 |
| 2002/0043093 A1 | 4/2002 | Barjesteh | |
| 2003/0126905 A1 | 7/2003 | Frenken | |

(Continued)

OTHER PUBLICATIONS

International Search Report issued in PCT/US2013/023152, dated Mar. 11, 2013, 2 pages.

*Primary Examiner* — Edward T Tolan
(74) *Attorney, Agent, or Firm* — Dentons US LLP

(57) ABSTRACT

A hydraulic tube expander includes expanding jaws engageable with an interior surface of a tube to expand the tube; a source of hydraulic fluid, a valve located between the source and the expanding jaws and a single-action release actuator operatively coupled to the valve. The valve is moveable between open and closed positions. In the closed position, hydraulic fluid can pass from the source to the expanding jaws and in the open position the hydraulic fluid can pass from the expanding jaws to the source. The actuator is movable between first and second positions. In the first position the valve is in the closed position. Movement of the actuator in a direction from the first position toward the second position moves the valve into the open position.

20 Claims, 4 Drawing Sheets

(56) References Cited

U.S. PATENT DOCUMENTS

2006/0243019 A1 11/2006 Shafer
2007/0214861 A1 9/2007 Lefavour

* cited by examiner

HYDRAULIC TUBE EXPANDER AND METHOD OF USE

CROSS-REFERENCE TO RELATED APPLICATIONS

This application is a divisional of and claims priority under U.S.C. § 120 to U.S. patent application Ser. No. 14/440,176, filed on May 1, 2015, and titled Hydraulic Tube Expander and Method of Use, which is a national stage filing of and claims priority to PCT patent application Ser. No. PCT/US2013/023152, filed on Jan. 25, 2013, which claims the benefit under 35 U.S.C. § 119 to U.S. Provisional Patent Application No. 61/598,669, filed Feb. 14, 2012, and titled Hydraulic Tube Expander and Method of Use, the entire contents of each of which is hereby incorporated herein by reference for all purposes.

FIELD OF THE INVENTION

The present invention relates to hydraulic tube expanders, and more particularly, relates to hydraulic tube expanders having single-action release actuators and/or a compact configuration.

BACKGROUND INFORMATION

Hydraulic tube expanders are used by plumbers, HVAC technicians, and others to expand a section of tube or pipe, such as an end of the tube or pipe. Traditional tube expanders are difficult to operate within tight spaces. When expanding an end of a copper tube, for example, end-users may use multiple styles of tools to expand the end of the tube. As such, a compact and simple to use hydraulic tube expander would be advantageous.

Some hydraulic expanders are linear shaped but do not provide sufficient compactness to allow for use within tight spaces. An example of a linear tool is shown in U.S. Pat. No. 6,619,099, entitled "Hydraulically powered flaring hand tool," issued on Sep. 16, 2003. One disadvantage of this configuration is that it requires use of two hands to fully operate the tube expander. In the case of engaging the expander with a tube or pipe, a nob must be turned to operate the expansion element of the expander. In addition, in the case of release and/or disengagement after expansion, the nob must be turned in a counter direction to release the pressure and retract/disengage the expansion elements. As such, the nob is operating in both directions, and requires two hands to operate.

SUMMARY OF THE INVENTION

It is an object of the present invention to overcome one or more of the above-described drawbacks and/or disadvantages of the prior art. In accordance with a first aspect, a hydraulic tube expander comprises expanding jaws engageable with an interior surface of a tube to expand the tube, a source of hydraulic fluid, a valve located between the source and the expanding jaws, and a single-action release actuator operatively coupled to the valve. The valve is moveable between open and closed positions, wherein in the closed position the hydraulic fluid can flow from the source to the expanding jaws and in the open position the hydraulic fluid can flow from the expanding jaws to the source. The actuator is movable between first and second positions, wherein in the first position the valve is in the closed position, and movement of the actuator in a direction from the first position toward the second position moves the valve into the open position.

In some embodiments, the single-action release actuator is biased from the second position toward the first position. In some embodiments, the valve is biased toward the closed position. In some embodiments, the hydraulic tube expander further comprises a spring biasing the valve.

In some embodiments, the hydraulic tube expander further comprises a tool body, wherein the single-action release actuator is pivotally mounted on the tool body. In some embodiments, the hydraulic tube expander is configured to be operated by a single hand of a user. In some embodiments, the hydraulic tube expander further comprises a head and a handle. The expanding jaws are disposed on the head, and the source of hydraulic fluid is disposed in the handle. In some embodiments, the hydraulic tube expander further comprises a trigger configured to pump the hydraulic fluid toward the expanding jaws. In some such embodiments, the hydraulic tube expander further comprises a normally-closed second valve located between the source and the expanding jaws. Operation of the trigger generates pressure in the hydraulic fluid to move the second valve from the normally-closed position to an open position thereof and pump the hydraulic fluid through the second valve toward the expanding jaws. In some such embodiments, the trigger is moveable between a first position and a second position and is normally biased toward the first position. Movement of the trigger in a direction from the first position toward the second position pumps the hydraulic fluid toward the expanding jaws.

In accordance with another aspect, a hydraulic tube expander comprises a tool body, a head connected to the tool body and comprising expanding jaws engageable with an interior surface of a tube to expand the tube; a handle connected to the tool body at a substantially 90.degree. angle relative to the head; and a trigger mounted approximately at a junction of the head and the tool body.

In some embodiments, the trigger is pivotally mounted. In some embodiments, the hydraulic tube expander further comprises a single-action release actuator disposed on the tool body and located substantially opposite the trigger. In some such embodiments, the single-action release actuator is pivotally mounted on the tool body. In some embodiments, the trigger is movable between a first position and a second position, wherein the trigger is normally biased toward the first position. Movement of the trigger in a direction from the first position toward the second position pumps the hydraulic fluid toward the expanding jaws. In some embodiments, the hydraulic tube expander is configured to be operated by a single hand of a user. In some such embodiments the trigger and single-action release actuator are configured to be operated by a single hand of a user.

In accordance with another aspect, a hydraulic tube expander comprises a tool body having a head and a handle attached thereto and forming a substantially 90.degree. angle. The head comprises expanding jaws engageable with an interior surface of a tube to expand the tube; a trigger disposed on the tool body and configured to pump hydraulic fluid from a source of hydraulic fluid toward the expanding jaws, and, in turn, expand the expanding jaws, and a single-action release actuator disposed on the tool body and operatively connected to a normally-closed release valve in fluid communication with the expanding jaws. The release actuator is configured to open the release valve, and, in turn, allow the hydraulic fluid to flow away from the expanding jaws. One of the release actuator and the trigger is disposed at the junction of the head and the tool body, and the other of the release actuator and the trigger is disposed on the substantially opposite side of the tool body from the one of the release actuator or the trigger.

In some embodiments, the single-action release actuator is pivotally mounted on the tool body. In some embodiments, the single-action release actuator defines a first position corresponding to the closed position of the release valve and a second position corresponding to an open position of the release valve. In some embodiments, the trigger is movable between a first position and a second position, wherein the trigger is normally biased toward the first position. Movement of the trigger in a direction from the first position toward the second position pumps the hydraulic fluid toward the expanding jaws. In some embodiments, the hydraulic tube expander is configured to be operated by a single hand of a user.

In accordance with another aspect, a hydraulic tube expander comprises a tool body having a head and a handle attached thereto and forming a substantially 90.degree. angle, the head comprising expanding jaws engageable with an interior surface of a tube to expand the tube, first means for pumping hydraulic fluid from a source of hydraulic fluid toward the expanding jaws, and, in turn, expanding the expanding jaws, and second means for opening a normally-closed release valve in fluid communication with the expanding jaws and allowing hydraulic fluid to flow away from the expanding jaws. The first and second means are configured to be operated by a single hand of a user.

In some embodiments, the first means is a trigger disposed on the tool body and the second means is a single-action release actuator disposed on the tool body. One of the release actuator and the trigger is disposed at the junction of the head and the tool body, and the other of the release actuator and the trigger is disposed on the substantially opposite side of the tool body from the one of the release actuator or the trigger.

In accordance with another aspect, a method comprises engaging a tube expander with a tube, engaging the expandable jaws with an interior surface of the tube, and expanding the jaws, to, in turn, expand the end of the tube. The tube expander includes a tool body having a head and a handle attached thereto and forming a substantially 90.degree. angle. The head comprises expanding jaws engageable with an interior surface of a tube to expand the tube, a trigger disposed on the tool body and configured to pump hydraulic fluid from a source of hydraulic fluid toward the expanding jaws, and, in turn, expand the expanding jaws, and a single-action release actuator disposed on the tool body and operatively connected to a normally-closed release valve in fluid communication with the expanding jaws. The release actuator is configured to open the release valve, and, in turn, allow the hydraulic fluid to flow away from the expanding jaws. One of the release actuator and the trigger is disposed at the junction of the head and the tool body, and the other of the release actuator and the trigger is disposed on the substantially opposite side of the tool body from the one of the release actuator or the trigger.

In some embodiments, the method further comprises the step of holding the tube expander with one hand of a user, and wherein the expanding step comprises actuating the trigger with the one hand at least once between a first position and a second position thereof, and pumping hydraulic fluid from the source of hydraulic fluid to the expanding jaws, and, in turn, expanding the jaws. In some such embodiments, method further comprises the step of actuating the release actuator between an unactuated position and an actuated position thereof, with the same one hand of the user holding the tube expander, and flowing the hydraulic fluid away from the expanding jaws, and, in turn, disengage the jaws from the end of the tube.

One advantage of the present invention is that a hydraulic tube expander is provided with a compact configuration to allow for single-handed use within tight spaces. Accordingly, end-users may need only a single tube expander to expand tube ends. Yet another advantage of the currently preferred embodiments of the present invention is that a tube expander is provided with a quick single-action release actuator to allow for simple retraction of expanding jaws, thereby disengaging with a tube that has been expanded. Further, advantageously, the configuration of the single-action release actuator allows for single-handed use of the tool within tight spaces.

These and other objects and advantages of the present invention, and/or of the currently preferred embodiments thereof, will become more readily apparent in view of the following detailed description and accompanying drawings.

DETAILED DESCRIPTION OF EMBODIMENTS OF THE INVENTION

Figure 1:
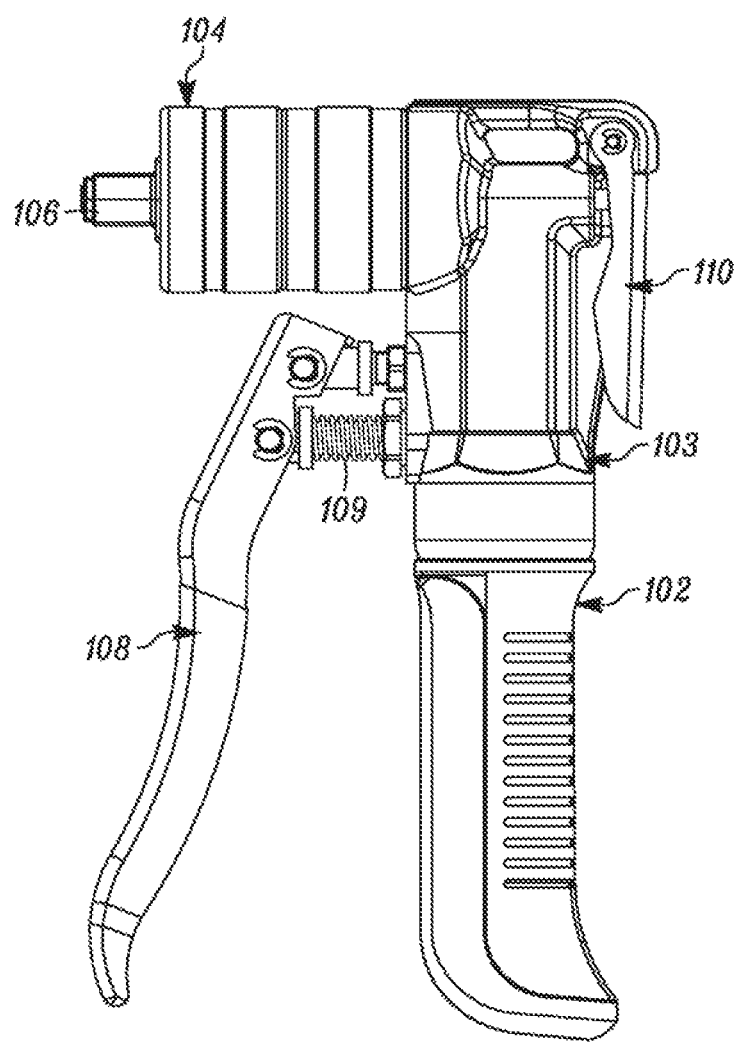
FIG. 1 is a side view of a preferred embodiment of a hydraulic tube expander of the present invention.
Figure 2:
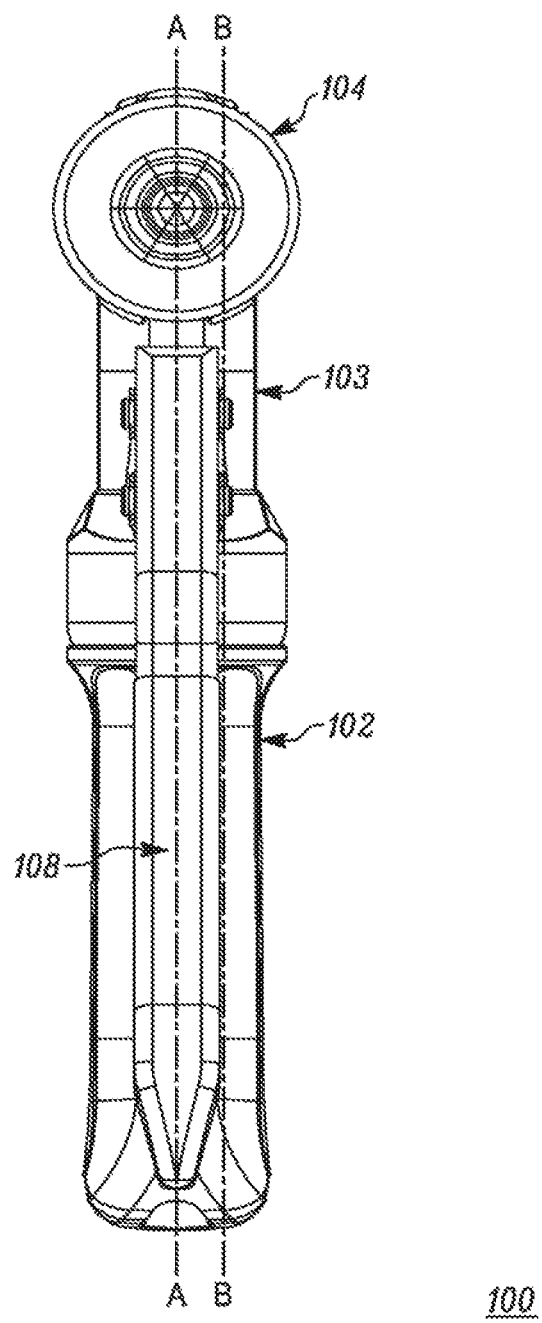
FIG. 2 is a front view of the hydraulic tube expander of FIG. 1.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Referring initially to FIG. 1, a hydraulic tube expander is indicated generally by the reference number 100. The hydraulic tube expander 100 includes a body 103, a handle 102 and a head 104. The head 104 includes expanding jaws 106, which are configured to engage with the interior surface of a tube or pipe (not shown) to expand a section or end of the pipe or tube. The hydraulic tube expander 100 also includes a trigger 108 which is configured to pump hydraulic fluid within the hydraulic tube expander 100 to operate the expanding jaws 106. Although described and shown herein as three separate elements, the hydraulic tube expander 100 may be formed from a single uniform body or in two or more joined elements, without departing from the scope of the present invention.

As shown in FIG. 1, the trigger 108 is biased into a first position, the position shown, with a biasing mechanism 109. During operation, the trigger 108 is pulled, actuated, or compressed toward the handle 102, to a second position, to, in turn, pump hydraulic fluid through the hydraulic tube expander 100. After compression of the trigger 108, the trigger is biased back from the second position toward the first position by the biasing mechanism 109. This allows repeated compression or action of the trigger 108 to pump hydraulic fluid that operates the expanding jaws 106 engaged with a pipe or tube to expand a section or end of the pipe or tube. In the illustrated embodiment, the biasing mechanism 109 is a spring biased rod or piston 140, where the spring is configured to bias the trigger 108 toward the first position. However, although described herein as a spring biased piston or rod, those of ordinary skill in the art will appreciate that the biasing mechanism 109 may be other spring biased mechanisms or other biasing mechanisms known in the art or will become known, without departing from the scope of the present invention.

Once the expanding jaws 106 are expanded to a desired expansion, a user must disengage the hydraulic tube expander 100 from the pipe or tube. To assist in quick action disengagement, the hydraulic tube expander 100 is configured with a single-action release actuator 110. The single-action release actuator 110 is configured to allow for a simple release of the hydraulic pressure that is applied to the expanding jaws 106, thereby allowing retraction of the expanding jaws 106 and disengagement from a pipe or tube that has been expanded.

As shown in FIG. 1, the hydraulic tube expander 100 is configured in an approximately 90.degree. orientation. The head 104 and the handle 102 are formed at an angle relative to each other about the tool body 103 by approximately 90.degree., which allows for a compact design and configuration. The trigger 108 is located at the junction of the head 104 and the tool body 103, with the single-action release actuator 110 disposed on substantially the opposite side of the tool body 103 from the trigger 108. This configuration aides in the compact design and simplicity of use, by allowing a user to use a single hand to operate the tool during both expansion and disengagement of the tool from a tube or pipe.

Figure 3:
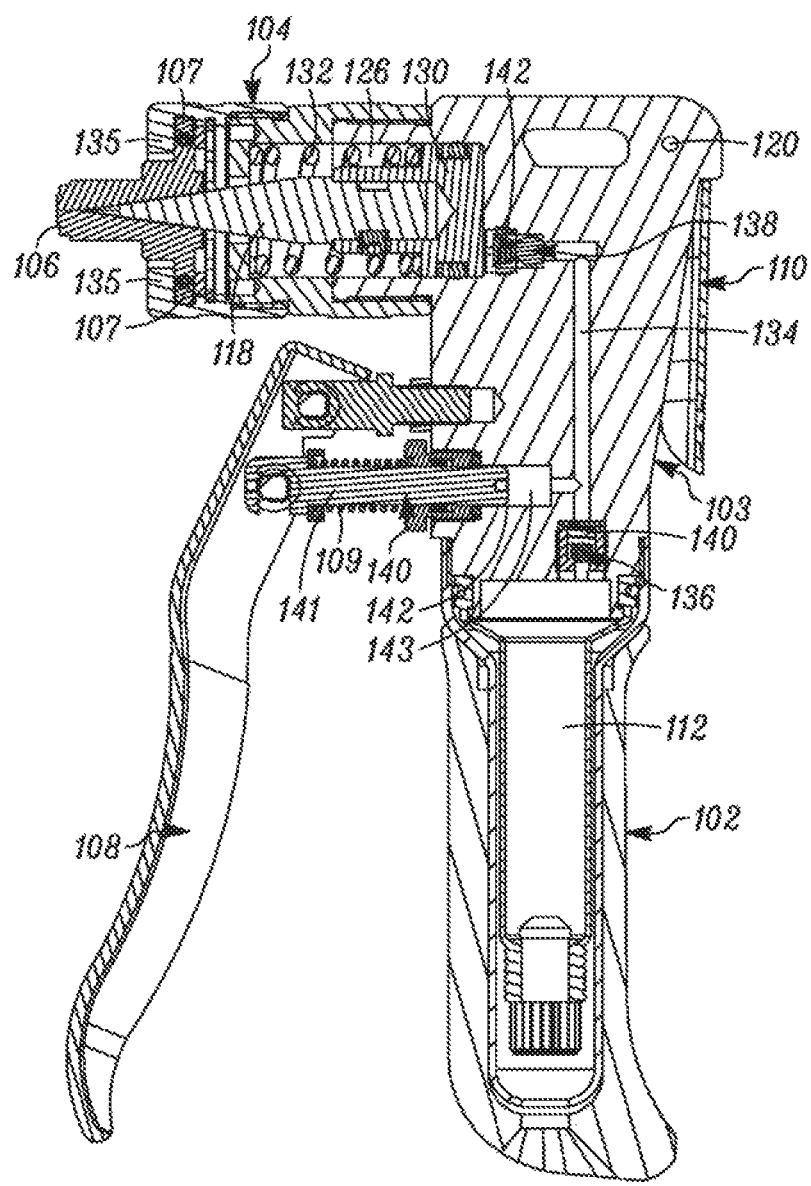
FIG. 3 is a cross-sectional view of the hydraulic tube expander of FIG. 1, along the sectional line A-A.

As shown in FIG. 3, the head 104 is threadedly connected with the tool body 103 and defines a cavity 126 with the tool body 103. However, as should be understood by those ordinary skill in the pertinent art, the head 104 can be attached directly or indirectly to the tool body 103 via other methods or means. The cavity 126 is configured to house a cone 118 adjacently secured to piston 130 having a biasing mechanism 132. The head 104 includes the expanding jaws 106, as described above. The expanding jaws 106 are configured to expand or retract based on pressure or force applied by the cone 118 thereto. As shown, the expanding jaws 106 are normally biased into a retracted closed position by one or more biasing mechanisms 107. In the illustrated embodiment, the biasing mechanisms 107 are springs that provide a biasing force to nominally maintain the expanding jaws 106 in, and to return the jaws 106 to, the closed position. However, as should be appreciated by one of ordinary skill in the pertinent art, other biasing mechanisms known or that later become known may be used to bias the expanding jaws toward the closed position as described herein.

The expanding jaws 106 can pivot about an end 135 of the head 104 to, in turn, expand and open. In the illustrated embodiment, the cone 118 is configured to move axially within the head 104 and apply a force onto the expanding jaws 106. The force applied by the cone 118 is sufficient to induce pivoting of the expanding jaws 106 about the end 135 of the head 104, which, in turn, deforms, i.e., expands, the tube as the jaws 106 expand outward and open. To apply the force from the cone 118 to the expanding jaws 106, hydraulic fluid is used to move the cone 118 axially within the head 104 of the hydraulic tube expander 100, as described herein.

The hydraulic fluid used to operate the expanding jaws 106 is stored in a hydraulic fluid source 112 within the tool body 103 of the hydraulic tube expander 100. Alternatively, the hydraulic fluid source may be configured as part of the handle 102. As shown, the hydraulic fluid source 112 is located within the handle 102, but is part of the tool body 103.

The tool body 103 includes an inlet fluid path 134 (FIG. 3), fluidly connectible with the hydraulic fluid source 112 and the cavity 126 to deliver hydraulic fluid from the fluid source 112 to the cavity 126. A one-way inlet valve 136 is located between the fluid source 112 and the fluid path 134. The valve 136 is biased in a normally closed position, and defines a valve opening pressure. When a pressure differential across the valve 136 exceeds the valve opening pressure, the valve opens and allows hydraulic fluid to flow therethrough, from the fluid source 112 and into the fluid path 134. Hydraulic fluid that flows from the fluid source 112 into the fluid path 134 is prevented from flowing back through the valve 136 and into the fluid source 112 because of the bias of the valve 136 into the closed position. Another one-way valve 138, located downstream from the one-way valve 136, is located between the fluid path 134 and the cavity 126. The one-way valve 137 defines the outlet to the fluid path 134 and the inlet to the cavity 126. Similarly to the valve 136, the valve 138 is also normally biased in a closed position, and also defines a valve opening pressure to allow the hydraulic fluid to flow from the fluid path 134 and into the cavity 126. As should be understood by one of ordinary skill in the pertinent art, as the fluid pressure within the cavity 126 increases, so does the valve opening pressure of the valve 138. When hydraulic fluid in the fluid path 134 applies pressure to the valve 138 exceeding the valve opening pressure, i.e., by actuation of the trigger 108, which exceeds the hydraulic pressure within cavity 126, the valve 138 opens and the hydraulic fluid passes therethrough. Hydraulic fluid that flows from the fluid path 134 into the cavity 126 is prevented from flowing back through the valve 138 and into the path 134 because of the bias of the valve 136 into the closed position. Accordingly, hydraulic pressure in the cavity 126 is maintained in order to move the cone 118 axially and operate the expanding jaws 106. In the illustrated embodiment, the valves 136, 138 are ball valves that are spring biased into the closed position by respective springs 140, 142. However, as should be understood by those of ordinary skill in the pertinent art, the valves 136, 138 may take the form of any one-way valve that allows fluid to pass through in a substantially single direction, and only when pressure is applied to overcome the valve opening pressure, i.e., the spring bias of the springs.

The piston 140 is operatively connected between the trigger 108 and the fluid path 134. The piston 140 includes a plunger 141 slideable within a body 142, and defining a compression chamber 143 therebetween. During operation, when the trigger 108 is pressed toward the handle 102, i.e., from the first position toward the second position, movement of the plunger 141 within the body 142 toward the fluid path 134 and into the chamber 143, pressurizes the hydraulic fluid within the fluid path 134. The configuration of the trigger mechanism permits the user to exert sufficient force onto the piston 140 to pressurize the hydraulic fluid to a pressure exceeding the valve opening pressure of the downstream valve 138 during normal operation, thereby opening the valve 138 and forcing the hydraulic fluid within the fluid path 134 to flow therethrough and into the cavity 126. When the trigger 108 is pressed toward the second position, the pressure building within the fluid path 134 also further biases the upstream valve 136 into the normally closed position, helping prevent fluid from flowing back into the fluid source 112. Upon release of the trigger 108, the trigger, along with the piston 140, is biased back from the second position toward the first position, i.e., in a direction away from the handle 102, by the biasing mechanism 109. This return stroke creates a vacuum in the fluid path 134 resulting in a pressure differential across the upstream valve 136 exceeding the valve opening pressure thereof, thereby opening the valve 136 and drawing hydraulic fluid from the fluid source 112, through the valve 136, and into the fluid path 134. When the trigger 108 is returned back toward the first position, the piston 140 is also withdrawn in the compression chamber 143, and the vacuum created within the fluid path 134 also further biases the downstream valve 138 into the normally closed position, preventing fluid from flowing out of the cavity 126.

Figure 4:
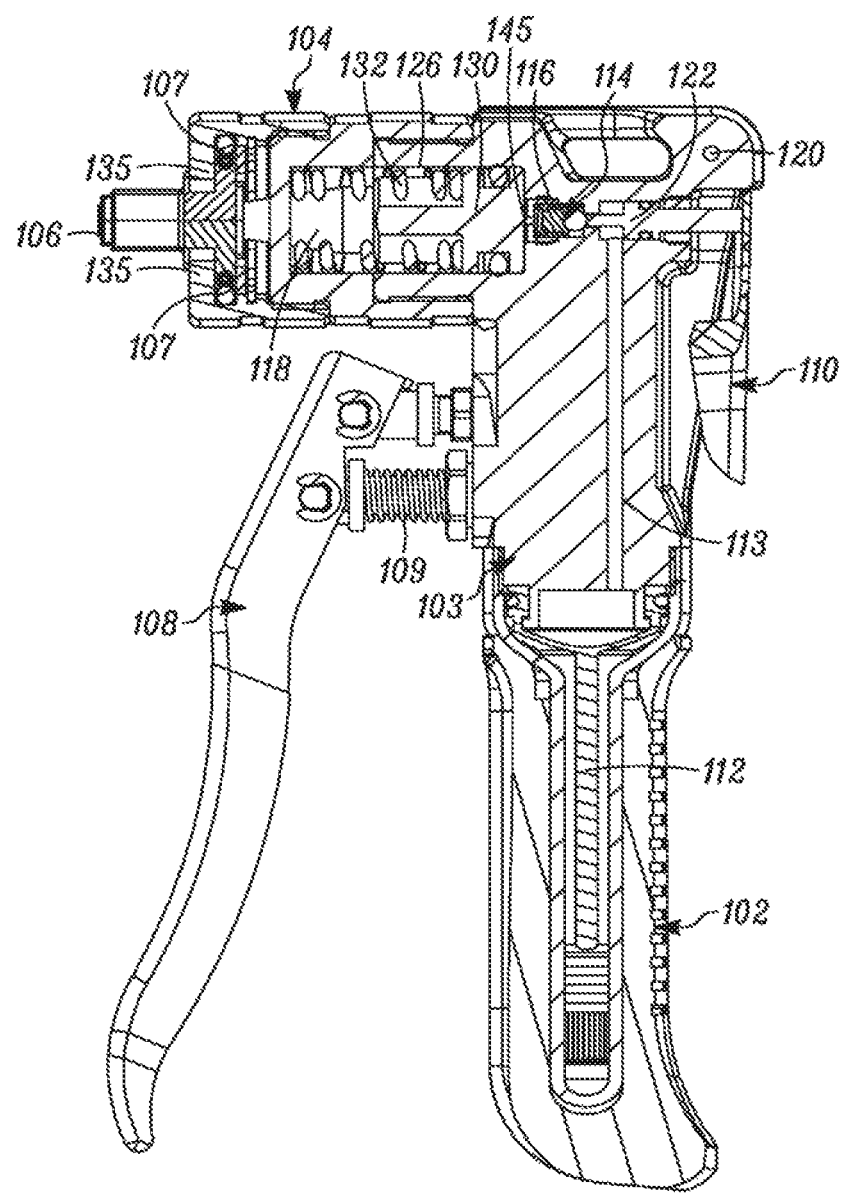
FIG. 4 is cross-sectional view of the hydraulic tube expander of FIG. 1, along the sectional line B-B.

As such, during operation of the hydraulic tube expander 100, the hydraulic fluid passes from the hydraulic fluid source 112, through the fluid path 134 and into the cavity 126 of the head 104. With each pump or operation of the trigger 108, additional hydraulic fluid is forced into the cavity 126, thereby increasing the hydraulic pressure therein applied to the cone 118 and, in turn, moving the cone 118 to operate the expanding jaws 106. In the illustrated embodiment, as the fluid fills the cavity 126, the piston 130 is moved axially within the cavity 126. As the piston 130 moves, it moves the cone 118, which is translated to the expanding jaws 106, in order to expand a tube or pipe that the hydraulic expander is engaged with (not shown). As the piston 130 moves, the biasing mechanism 132, such as, for example, without limitation, a spring, is compressed. Although described and shown as a spring, the biasing mechanism 132 may be any biasing mechanism known in the art or that may become known in the art, without departing from the scope of the present invention. Now referring to FIG. 4, the hydraulic fluid that enters the cavity 126 is held within the cavity 126 between the piston 130 and the inlet valve 138 and an outlet valve 114, which are each biased toward a closed position by the respective biasing mechanisms 142, 116. As explained above, with each pump or operation of the trigger 108 more fluid may be conveyed into the cavity 126. As more hydraulic fluid enters the cavity 126, the piston 130 moves further axially against the bias of the mechanism 132, which becomes further compressed. Axial movement of the piston 130 toward the cones 118 moves the cone 118 axially toward the expanding jaws 106, to, in turn, induce the expanding jaws 106 to hinge about the ends 135 of the head 104 and into the desired open and expanded position.

After operation of the expanding jaws 106 to expand a section of tube or pipe, the hydraulic tube expander must be disengaged from the tube or pipe. To disengage the tube expander 100 from the pipe or tube, the expanding jaws 106 must be returned to their closed position. To do so, the hydraulic pressure within the cavity 126 must be released so that the piston 130 and thereby the cone 118 can be retracted from the jaws 106. To release the pressure, the hydraulic tube expander 100 is configured with a single-action release actuator 110 to allow for simple and quick release of the hydraulic pressure within the cavity 126 of the head 104.

In the illustrated embodiment, the tool body 103 also includes an outlet fluid path 113 (FIG. 4), fluidly connectible with the fluid source 112 and the cavity 126, configured to allow flow of hydraulic fluid only in the direction from the cavity 126 back to the fluid source 112. The one-way valve 114 is located between the outlet 145 of the cavity 126 and the inlet of the fluid path 113 and is biased in a normally closed position. Similarly to the valves 136 and 138, the valve 114 in the illustrated embodiment is a ball valve that is spring biased into the closed position by a spring 116. However, as previously mentioned, one of ordinary skill in the pertinent art should understand that the valve 114 may take the form of any one-way valve that allows fluid to pass through in a substantially single direction. The single-action release actuator 110 is operatively connected to the valve 114 so as to open it. Operation of the single-action release actuator 110 applies a force on, or operates, a piston 122. The piston 122 is operatively connected with the valve 114 such that a force applied by the piston 122 overcomes the closing force of the valve 114 and opens the valve 114, thereby allowing the hydraulic fluid in the cavity 126 of the head 104 to return from the cavity 126, into the fluid path 113, and back to the hydraulic fluid source 112.

Although the illustrated embodiment has separate fluid paths 113, 134, as should be understood by those of ordinary skill in the pertinent art, the tool body 103 may alternatively include a single fluid path fluidly connectible with the fluid source 112 and the cavity 126. Such a flow path would convey hydraulic fluid from the fluid source 112 to the cavity 126 by operation of the trigger 108 and would convey hydraulic fluid from the cavity 126 to the fluid source 112 upon actuation of the release actuator 100.

In the illustrated embodiment, the single-action release actuator 110 is pivotally mounted on the hydraulic tube expander 100, on a side thereof opposing the trigger 108, using a hinge 120 and biased into a first position. Operation of the single-action release actuator 110 moves the single-action release actuator 110 from the first position toward a second position. The first position of the single-action release actuator 110 corresponds to a closed position of the valve 114 or a position such that a force is not applied to the valve 114 by the piston 122. The second position corresponds to an open position of the valve 114 or a position such that a force is applied to the valve 114 by the piston 122, allowing fluid to pass through the valve 114.

Upon operation of the single-action release actuator 110, the piston 122 is moved axially toward the head 104 and opens the valve 114. When the valve 114 opens, the hydraulic pressure within the cavity 126 drains the fluid therefrom, through the open valve 114, and into the fluid path 113 and back to the fluid source 112. The biasing mechanism 132 will also assist in moving the piston 130 in a direction toward the valve 114. Accordingly, during operation of the single-action release actuator, the force is relieved from the cone 118, and the cone 118 is withdrawn rearwardly, allowing the biasing mechanism 107 to return the jaws 106 to the closed position thereby disengaging the jaws from the tube or pipe.

Advantageously, embodiments of the present invention provide a compact hydraulic tube expander. To be compact, the tool is formed in an approximately 90.degree. orientation. Furthermore, a trigger is configured to be located at the junction of a head and tool body of the hydraulic tube expander such that the configuration forms a pistol-type orientation, allowing for very compact and simple use.

Moreover, this compact configuration allows for a user to use the tool with a single hand, making operation simple and able to be used within tight spaces.

Further, advantageously, embodiments of the present invention provide a single-action release actuator, located on the opposing side of the tool body from the trigger, that allows for quick and simple release and disengagement of the tool from an expanded tube or pipe. The positioning/location and functionality of the single-action release actuator also allows for single-hand use of the tool, without requiring more complex operation to disengage the tool from a pipe or tube. For example, by gripping the tool with a single hand, a user may operate a trigger to expand a tube by using only the user's fingers, and then may release the tool by pressing the single-action release actuator with either the user's thumb or palm. This requires no adjustment of the user's hand on the tool, or use of a second hand, to operate either expansion of the expanding jaws or disengagement of the tool from a tube or pipe.

As may be recognized by those of ordinary skill in the pertinent art based on the teachings herein, numerous changes and modifications may be made to the above-described embodiments of the present invention without departing from its scope as defined in the appended claims. For example, the expanding jaws may be operated by mechanisms other than a cone and piston arrangement that are currently known or that later become known. Additionally, although the movement of the cone and other elements is described as axial movement, those skilled in the art will appreciate that other forms of movement and operation may be used without departing from the scope of the present invention. In addition, the tool body, the head, and the handle may be a single uniform body, or may be configured with two or more elements, without departing from the scope of the present invention. Additionally, as shown in the figures, a threaded connection is shown between the head and the handle to the tool body of the hydraulic tube expander. Those skilled in the art will appreciate that other forms of connection may be used between the head, the handle, and the tool body. Moreover, although the single-action release actuator is described herein as hinged, the actuator may be configured in other arrangements without departing from the scope of the present invention. For example, the single-action release actuator may be spring biased or configured with other means of biasing or attaching, without departing from the scope of the present invention. Furthermore, although the valve is shown as a ball valve with a conical spring biasing the valve into a closed position, other types of valves and configurations may be used without departing from the scope of the present invention. Accordingly, this detailed description of embodiments is to be taken in an illustrative, as opposed to limiting sense.

What is claimed is:

1. A method comprising:
receiving a tube expander and a tube having an open end portion, wherein the tube expander including a tool body having a head and a handle attached thereto, wherein the head comprising a plurality of expandable jaws engageable with an interior surface of the tube through the open end portion to expand the tube, wherein the tube expander including a biasing mechanism and a trigger, wherein the biasing mechanism and the trigger are disposed on the tool body, wherein the trigger is configured to pivot between a first position and a second position, wherein the trigger is configured to repeatedly pump a hydraulic fluid from a source of the hydraulic fluid toward the expandable jaws based on the trigger pivoting from the first position to the second position, and, in turn, expand the expandable jaws, wherein the biasing mechanism is configured to pivotably bias the trigger from the second position to the first position, wherein the tube expander including a single-action release actuator disposed on the tool body and operatively connected to a normally-closed release valve in fluid communication with the expandable jaws, wherein the release actuator is configured to open the release valve, and, in turn, allow the hydraulic fluid to flow away from the expandable jaws, wherein one of the release actuator and the trigger is disposed at a junction of the head and the tool body, and the other of the release actuator and the trigger is disposed on the substantially opposite side of the tool body from the one of the release actuator or the trigger, wherein the trigger is located at the junction of the head and the tool body such that a pistol-type configuration is formed, wherein the pistol-type configuration enables a one-handed operation of the tube expander;
engaging the expandable jaws with the interior surface of the tube through the open end portion; and
expanding the expandable jaws, to, in turn, expand the open end portion of the tube via the one-handed operation of the tube expander.

2. The method of claim 1, further comprising:
holding the tube expander with one hand of a user, wherein the expandable jaws are expanded via actuating the trigger with the one hand at least once between the first position and the second position thereof, and pumping the hydraulic fluid from the source of the hydraulic fluid to the expandable jaws, and, in turn, expanding the expandable jaws.

3. The method of claim 2, further comprising:
actuating the release actuator between an unactuated position and an actuated position thereof, with the same one hand of the user holding the tube expander; and
causing the hydraulic fluid to flow away from the expandable jaws, and, in turn, disengage the expandable jaws from the open end portion of the tube.

4. A method comprising:
receiving a tube expander comprising:
a head comprising a plurality of expandable jaws;
a tool body coupled to the head and comprising a handle;
a source of a hydraulic fluid;
a biasing mechanism disposed on the tool body;
a trigger configured to pivot between a first position and a second position, wherein the trigger is configured to repeatedly pump the hydraulic fluid from the source of the hydraulic fluid toward the expandable jaws based on the trigger pivoting from the first position to the second position and, in turn, expand the expandable jaws, wherein the biasing mechanism is configured to pivotably bias the trigger from the second position to the first position, wherein the trigger is located at a junction of the head and the tool body such that a pistol-type configuration is formed, wherein the pistol-type configuration enables a one-handed operation of the tube expander;
a fluid pipe path extending from the source of the hydraulic fluid toward the expandable jaws;
a release actuator operatively connected to a one-way valve in fluid communication with the expandable jaws, wherein the release actuator is configured to open the one-way valve and allow the hydraulic fluid to flow away from the expandable jaws engaging the expandable jaws with an interior of a tube; and causing the expandable jaws to be expanded based on the jaws contacting the interior of the tube via the one-handed operation of the tube expander.

5. The method of claim 4, further comprising:

adjusting the trigger from the first position to the second position, wherein the expandable jaws expand in response to adjusting the trigger from the first position to the second position.

6. The method of claim 5, further comprising:

pumping the hydraulic fluid from the fluid pipe path towards the expandable jaws in response to adjusting the trigger from the first position to the second position.

7. The method of claim 6, wherein the hydraulic fluid is pumped from the tool body of the tube expander into the head of the tube expander.

8. The method of claim 6, wherein the one-way valve is a first one-way valve, wherein the hydraulic fluid is pumped through a second one-way valve from the fluid pipe path towards the expandable jaws.

9. The method of claim 6, wherein the one-way valve is a first one-way valve, wherein adjusting the trigger from the first position to the second position generates a pressure differential across a second one-way valve disposed along a distal end of the fluid pipe path between the source of the hydraulic fluid and the expandable jaws.

10. The method of claim 6, wherein the tube expander further comprises a cavity disposed within the head of the tube expander and a conical member disposed within the cavity, and wherein pumping the hydraulic fluid from the fluid pipe path towards the expandable jaws in response to adjusting the trigger from the first position to the second position further comprises pumping the hydraulic fluid into the cavity.

11. The method of claim 10, further comprising:

moving the conical member in an axial direction in response to pumping the hydraulic fluid into the cavity, wherein the expandable jaws expand in a first direction away from one another in response to moving the conical member in the axial direction.

12. The method of claim 5, further comprising:

adjusting the trigger from the second position to the first position; and pumping the hydraulic fluid from the source of the hydraulic fluid into the fluid pipe path in response to adjusting the trigger from the second position to the first position.

13. The method of claim 4, further comprising:

biasing the expandable jaws in a retracted position.

14. The method of claim 4, further comprising:

retracting the expandable jaws.

15. The method of claim 14, further comprising:

adjusting the release actuator such that the expandable jaws retract in response.

16. The method of claim 15, wherein the tube expander further comprises a cavity disposed within the head, wherein adjusting the release actuator opens the one-way valve to allow the hydraulic fluid to flow from the cavity towards the source of the hydraulic fluid.

17. The method of claim 16, wherein the tube expander further comprises an outlet fluid path extending from the cavity to the source of the hydraulic fluid and separate from the fluid pipe path, wherein the one way valve is disposed along the outlet fluid pipe path.

18. A method comprising:

receiving a tube expander comprising:

a head comprising a plurality of expandable jaws;

a tool body coupled to the head and comprising a handle;

a source of a hydraulic fluid;

a biasing mechanism engaging the tool body outside the tool body;

a trigger configured to pivot between a first position and a second position, wherein the trigger configured to repeatedly pump the hydraulic fluid from the source of the hydraulic fluid toward the expandable jaws based on the trigger pivoting from the first position to the second position and, in turn, expand the expandable iaws, wherein the biasing mechanism is configured to pivotably bias the trigger from the second position to the first position, wherein the biasing mechanism engages the trigger outside the tool body, wherein the biasing mechanism extends between the trigger and the tool body outside the tool body, wherein the trigger is located at a junction of the head and the tool body such that a pistol-type configuration is formed, wherein the pistol-type configuration enables a one-handed operation of the tube expander;

a fluid pipe path extending from the source of the hydraulic fluid toward the expandable jaws;

engaging the expandable jaws with an interior of a tube; and expanding the jaws within the interior of the tube based on the expandable jaws engaging the interior of the tube via the one-handed operation of the tube expander.

19. The method of claim 18, wherein the fluid pipe path has a distal end portion, and further comprising:

adjusting the trigger from the first position to the second position;

generating a pressure differential across a one way valve disposed along the distal end portion of the fluid pipe path; and pumping the hydraulic fluid from the fluid pipe path towards the expandable jaws and through the one-way valve in response to adjusting the trigger from the first position to the second position.

20. The method of claim 19, wherein the tube expander further comprises a cavity disposed within the head of the tube expander and a conical member disposed within the cavity, and wherein pumping the hydraulic fluid from the fluid pipe path towards the expandable jaws in response to adjusting the trigger from the first position to the second position further comprises:

pumping the hydraulic fluid into the cavity; and moving the conical member in an axial direction in response to pumping the hydraulic fluid into the cavity.

* * * * *